United States Patent [19]

Bukac et al.

[11] 4,055,552

[45] Oct. 25, 1977

[54] HOT-MELT ADHESIVES BASED ON ANIONIC TERPOLYMERS OF LACTAMS

[75] Inventors: Zbyněk Bukac; Jan Šebenda, both of Prague; Richard Suchý, Liberec, all of Czechoslovakia

[73] Assignee: Ceskoslovenska akademie ved, Prague, Czechoslovakia

[21] Appl. No.: 689,964

[22] Filed: May 26, 1976

[30] Foreign Application Priority Data

June 10, 1975 Czechoslovakia .................. 4055/75

[51] Int. Cl.² .............................................. C08G 69/14
[52] U.S. Cl. ........................ 260/78 L; 260/32.6 NA; 260/33.4 R; 260/78 A; 428/474
[58] Field of Search ........................... 260/78 L, 78 A

[56] References Cited

U.S. PATENT DOCUMENTS 3,216,976  11/1965  Schwartz et al. .................. 260/78 L
3,359,227  12/1967  Amann et al. ..................... 260/78 L
3,644,264   2/1972  Hyde .............................. 260/78 L Primary Examiner—Harold D. Anderson

[57] ABSTRACT

The invention relates to hot-melt adhesives based on anionic copolymers of lactams, where one of the starting lactams is 8.octanolactam in the amount of 10–90 mol.% and the other at least 2 lactams containing 6 or more 6 atoms in the ring are in the amount 90–10 mol.%. These further lactams are preferably 6-hexanolactam and 12-dodecanolactam. The melt adhesives may contain further additives, as dyes, fillers, molecular weight regulators, etc. The anionic copolymerization used for their manufacturing is the simple and rapid technique which requires lower temperatures and can be easily performed continuously. The said polyamide melt adhesives are applicable e.g. in clothing and footwear industry and other textile and leather working.

3 Claims, No Drawings

HOT-MELT ADHESIVES BASED ON ANIONIC TERPOLYMERS OF LACTAMS

The invention relates to hot-melt adhesives based on anionic copolymers of lactams, where one of the lactams used is octahydro-2H-azonin-2-one (8-octanolactam).

Recently, polymeric materials are often sought which possess properties of so-called "hot-melt adhesives". A great advantage of these adhesives consists in application merely by heating without solvents or chemical reaction. Such bonding process is very economical and has wide possibilities of application, for example, in textile and leather-working industry or in packaging.

Among the great number of proposed polymeric materials, polyamides particularly found the practical use thanks to their properties, as for example, Platamid ® (nylon 66) in textile working and Versamids ® or Versalons ® (the latter two being tthermoplastic polyamide resins produced by General Mills, Inc.) in leather working. This type of hot-melt adhesives is based on copolymers of Nylon 6/12/66 alone or with admixtures. The copolymers containing Nylon 66 as a component, e.g. Platamid ®, may be prepared only by the so-called hydrolytic-condensation polymerization which requires high temperatures, e.g. about 260 – 280°C, and long reaction periods, e.g. about 4 – 8 hours. The similar holds for Versamids ® and Versalons ® which are prepared by polycondensation of diamines with diacids.

According to this invention, melt adhesives of superior properties may be prepared from anionic copolyamides, wherein one of the starting components is 8-octanolactam (octahydro-2H-asonin-2-one) in the amount 10 – 90 molar percent and further at least two componets are lactams containing 6 or more carbon atoms in their cycle in the amount 90–10 molar percent.

The preparation of terpolymers according to this invention is quite easy, unusually rapid and is performed by the anionic polymerization using known initiators and activators, and, if it is desired, also stabilizers of molecular weight and other additives of special purpose, as dyes, plasticizers, and the like.

With regard to the high polymerization velocity, the manufacturing of melt adhesives according to this invention is much more economical than with the previous types, e.g. copolyamides 6/12/66. Such manufacturing may be easily set continuous, similarly as it is known with anionic polymerization of lactams, for example, according to the Czechoslovak Pat. No. 97,332. Since the equipment for continuous manufacturing is very simple for this purpose, it enables the direct preparation of hot-melt adhesives according to this invention by consumers for their own demand. This fact is another advantage of hot-melt adhesives according to this invention.

Further advantage consists in the possible direct application of adhesives in the molten state to a base, e.g. textile, and the like. However, they can be prepared also in another usual form, for example, as powders or nettings. Due to the high content of amide groups, the said copolymers are insoluble in common cleaning agents and may be therefore used e.g. for laminating of fabrics, and the like.

The following examples illustrate the characteristic properties of the said copolymers and their simple preparation, but do not limit the scope of the invention by any means.

EXAMPLE 1

The polymerization mixture of lactams consisting of 2.9 g of 8-octanolactam, 2.71 g of 6-hexanolactam and 4.5 g of 12-dodecanolactam was used for successive dissolution of 0.5 mol. % of sodium 6-hexanolactamate and 0.75 mol.% of N-(2-ethyl-3-oxohexanoyl)-4-methoxyaniline. The resulting solution was transferred into an ampoule and sealed under inert atmosphere. The copolymer melting at about 100°C was obtained after heating to 180° C for 60 minutes. Its solution in cresol exhibited the intrinsic viscosity 1.321.

EXAMPLE 2

The same result as in Example 1 was obtained after heating the polymerization mixture prepared as in Example 1 to 250°C for 60 min. The copolymer is soluble in warm dimethylformamide and insoluble in trichloroethylene.

EXAMPLES 3 to 9

Mixtures of lactams were anionically polymerized, in the same way as in Example 1, giving the copolymers with properties of melt adhesives as it is given in the Table. TABLE. Copolymerization of 6-hexanolactam, 8-octanolactam and 12-dodecanolactam under conditions given in Example 1; L-6 means 6-hexanolactam, L-8 means 8-octanolactam and L-12 means 12-dodecanolactam. TTP is the melting temperature of polymer determined by the technique of DSC (figure in parentheses means the temperature of melting peak maximum).

| Ex. | Mixture composition, mol.% | | | TTP/DSC, °C | Intrinsic viscosity |
| --- | --- | --- | --- | --- | --- |
| | L-6 | L-8 | L-12 | | |
| 3 | 60 | 20 | 20 | 80–140 (123) | 1.134 |
| 4 | 34 | 33 | 33 | 85–125 (115) | 1.321 |
| 5 | 50 | 25 | 25 | 120–145 (125) | 0.8107 |
| 6 | 40 | 40 | 20 | 70–135 (112) | |
| 7 | 25 | 25 | 50 | 80–150 (135) | |
| 8 | 10 | 45 | 45 | 100–142 (120) | |
| 9 | 40 | 30 | 30 | 90–140 (115) | |

EXAMPLE 10

The polymerization mixture containing equimolar amounts of 6-hexanolactam, 7-heptanolactam and 8-octanolactam was melted and used for the successive dissolution of 0.3 mol.% of sodium dihydro-bis-(methoxyethoxy)aluminate in the form of 70% benzene solution (Synhydrid ®) and 0.3 mol.% of N-benzoylcaprolactam at about 100° C. After 60 min of heating to 180° C, 96 wt.% of copolymer was obtained which is suitable as melt adhesive.

EXAMPLE 11

The analogous result as in Example 10 was obtained by polymerization of the mixture containing 50 mol.% of 6-hexanolactam, 25 mol.% of 8-octanolactam and 25 mol.% of 7-heptanolactam, if 0.1 mol.% of 1,3,5,-triphenyl-s-triazine-2,4,6-trione was used instead of 0.3 mol.% of N-benzoylcaprolactam.

EXAMPLE 12

The polymerization mixture consisting of 50 mol.% of 6-hexanolactam, 25 mol.% of 8-octanolactam and 25 mol.% of 11-undecanolactam was used for the successive dissolution of 0.25 mol.% of sodium 6-hexanolactamate and 0.25 mol.% of 2,2,4-trimethyl-3-oxopentanoanilide as an activator, The copolymer with random distribution of units was obtained after heating to 200° C for 60 min in the yield of 92%.

We claim:

1. Hot-melt adhesive from an anionic terpolyamide of 10–90 mol% 8-octanolactam and 90–10 mol% of at least two different anionically polymerizable lactams having 6 or more carbon atoms in the lactam ring, one of said latter lactams being of a lower molecular weight than the other, the latter lower molecular weight lactam being present in an amount of 10–60 mol% and the latter higher molecular weight lactam being present in an amount of 20–50 mol%.

2. Hot-melt adhesive as set forth in claim 1, wherein said latter two polymerizable lactams are 6-hexanolactam and 12-dodecanolactam.

3. Hot-melt adhesive as set forth in claim 1 which contain one or more dye, filler and molecular weight regulator.

* * * * *